United States Patent [19]

Hayakawa et al.

[11] Patent Number: 5,703,739
[45] Date of Patent: Dec. 30, 1997

[54] COMPOSITE MAGNETIC HEAD

[75] Inventors: Yuuichi Hayakawa, Tokyo; Shinichi Saitoh, Gunma; Isao Matsuzaki, Gunma; Masayoshi Kayama, Gunma, all of Japan

[73] Assignee: NEC Corporation, Tokyo, Japan

[21] Appl. No.: 261,239

[22] Filed: Jun. 14, 1994

Related U.S. Application Data

[63] Continuation of Ser. No. 917,303, Jul. 23, 1992, abandoned.

[30] Foreign Application Priority Data

Jul. 23, 1991 [JP] Japan .................... 3-182639

[51] Int. Cl.$^6$ ........................... G11B 3/00
[52] U.S. Cl. ............................ 360/121
[58] Field of Search .................. 360/128, 121, 360/125

[56] References Cited

U.S. PATENT DOCUMENTS

| | | | |
|---|---|---|---|
| 4,118,747 | 10/1978 | Hanaoka et al. | 360/121 |
| 4,152,742 | 5/1979 | Kronfield | 360/125 |
| 4,618,902 | 10/1986 | Kuriyama | 360/121 |
| 4,809,112 | 2/1989 | Noguchi et al. | 360/121 |
| 5,005,097 | 4/1991 | Matsuoka | 360/121 |
| 5,041,936 | 8/1991 | Hayakawa | 360/121 |
| 5,497,283 | 3/1996 | Kato | 360/128 |

*Primary Examiner*—Jefferson Evans
*Assistant Examiner*—David D. Davis
*Attorney, Agent, or Firm*—Sughrue, Mion, Zinn, Macpeak & Seas, PLLC

[57] ABSTRACT

A composite magnetic head for use in a magnetic disk drive and having a higher core and a lower core assigned to high track density and low track density, respectively. A single magnetic bar is interposed between the higher and lower cores. A single spring having a generally U-shaped section sandwich the cores and magnetic bar from both sides. As a result, the magnetic bar is stably held in close contact with the cores.

2 Claims, 3 Drawing Sheets

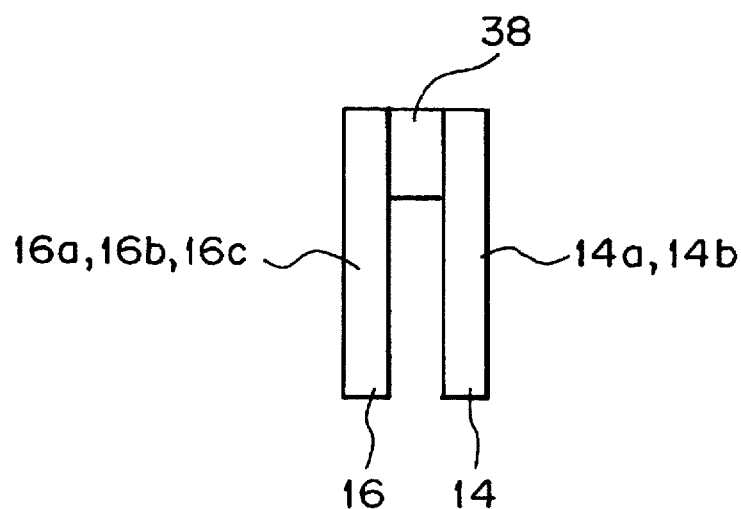
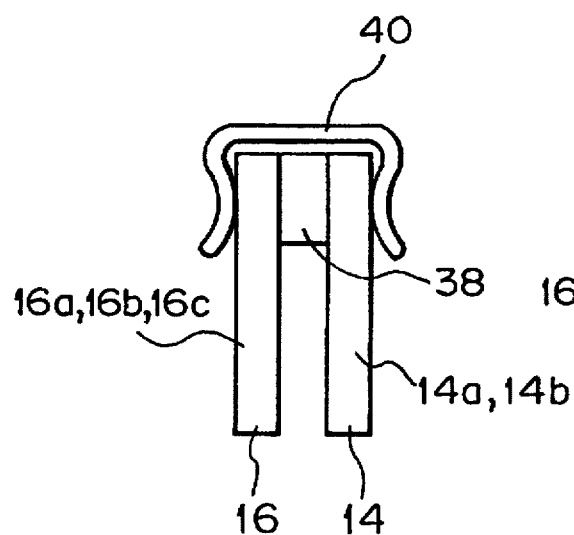
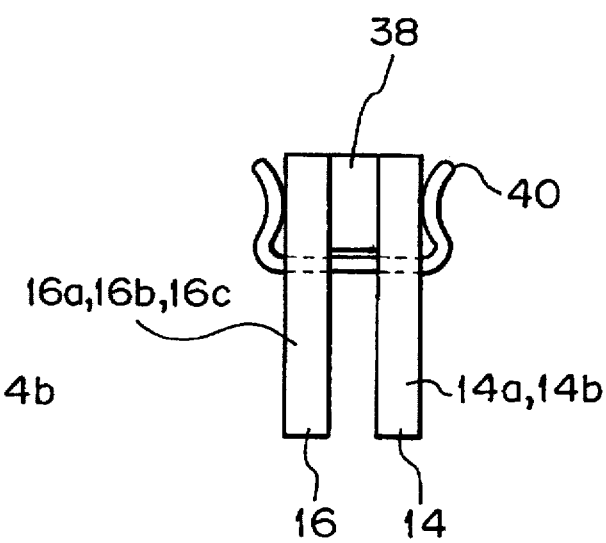

COMPOSITE MAGNETIC HEAD

This is a Continuation of application of Ser. No. 07/917,303 filed Jul. 23, 1992.

BACKGROUND OF THE INVENTION

The present invention relates to a magnetic head for use in a magnetic disk drive and, more particularly to a composite magnetic head having a higher core and a lower core assigned to high track density and low track density, respectively.

A floppy disk drive is extensively used with, for example, a personal computer as an external memory. Today, floppy disk drives are required to have a capacity of more than 10 megabits, fueling the race for development. Meanwhile, there has been developed a magnetic head selectively operable in a higher mode for recording and reproducing data from a large capacity floppy disk or in a lower mode for recording and reproducing data from a conventional small capacity floppy disk, so float huge software assets available with existing small capacity floppy disks may be effectively used. Generally, the composite magnetic head includes a slider having two contiguous parts. A higher core and a lower core are provided on one part of the slider in parallel with each other and respectively assigned to a large capacity floppy disk, or high track density, and a small capacity floppy disk, or low track density. A coil is wound round each leg of the cores. Magnetic bars are held in contact with the legs of the cores to form a closed magnetic path. Springs each having a generally U-shaped section may sandwich associated ones of the legs of the cores and the magnetic from both sides in order to stabilize the contact of the legs with the bars. However, such a conventional arrangement has the following problems.

(1) Arranging the minute magnetic bars in the limited space available in the head is not easy and not practicable without resorting to a number of steps.

(2) It is difficult to hold the legs and bars in close contact; incomplete contact would aggravate irregularity in recording and reproducing characteristics.

(3) Each spring has to sandwich the associated legs and magnetic bar from both sides within the limited space, resulting in difficult assembly and a disproportionate number of steps.

SUMMARY OF THE INVENTION

It is therefore an object of the present invention to provide a composite magnetic head for a magnetic disk drive which is easy to assemble and achieves stable recording and reproducing characteristics.

A composite magnetic head for recording and reproducing data from a magnetic disk of the present invention comprises a slider made up of two parts, an upper core provided in one of the two parts of the slider for recording and reproducing data from a magnetic disk having a high track density, a lower core also provided in the one part of the slider and adjoining the upper core for recording and reproducing data from a magnetic disk having a low track density, and a magnetic bar interposed between the upper core and the lower core and contacting legs of the upper core and legs of the lower core.

BRIEF DESCRIPTION OF THE DRAWINGS

The above and other objects, features and advantages of the present invention will become more apparent from the following detailed description taken with the accompanying drawings in which:

FIG. 6 is a view showing the arrangement of cores and a magnetic bar included in the embodiment; and FIGS. 7 and 8 are views similar to FIG. 6, each showing a modification of the embodiment.

DESCRIPTION OF THE PREFERRED EMBODIMENT

Figure 1:
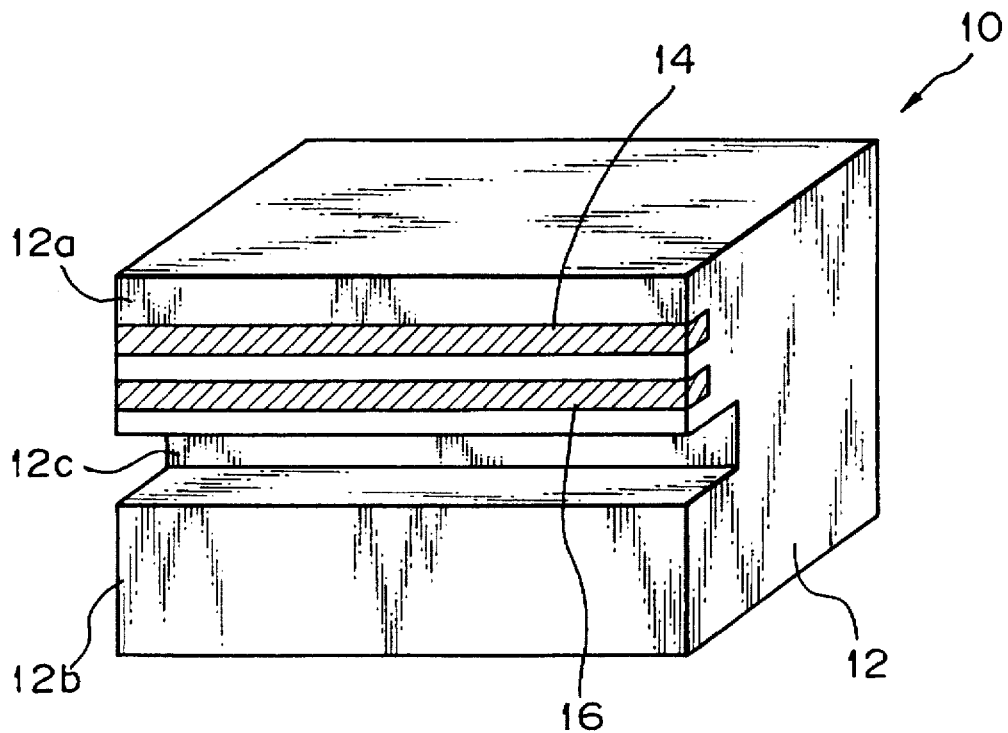
FIG. 1 is a perspective view of a conventional composite magnetic head.

To better understand the present invention, a brief reference will be made to a conventional magnetic head selectively operable in a higher mode or a lower mode, shown in FIG. 1. As shown, the magnetic head, generally 10, is made up of a slider 12, a higher core 14 assigned to a large capacity floppy disk, or high track density, and a lower core 16 assigned to a conventional small capacity floppy disk, or low track density.

Figure 2:
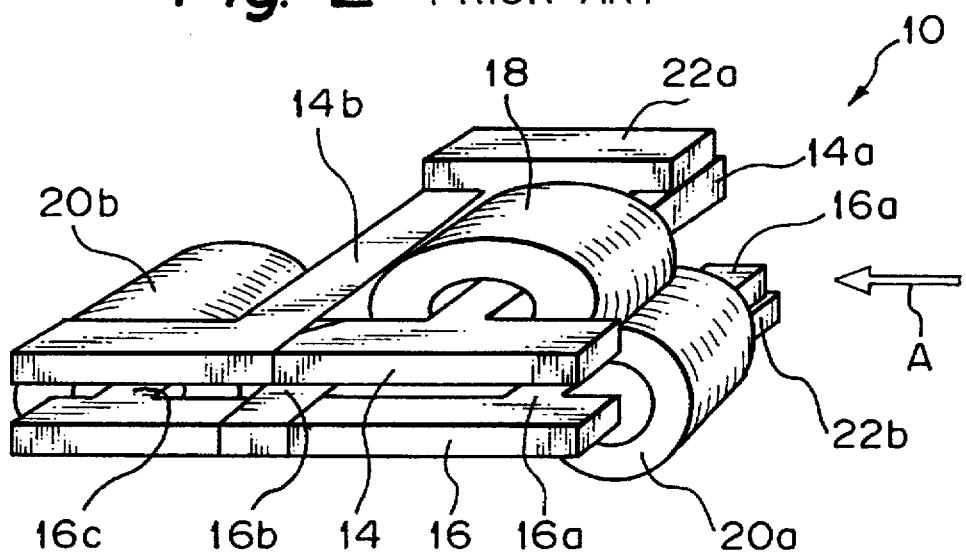
FIG. 2 is a perspective view showing the internal arrangement of the head of FIG. 1.
Figure 3:
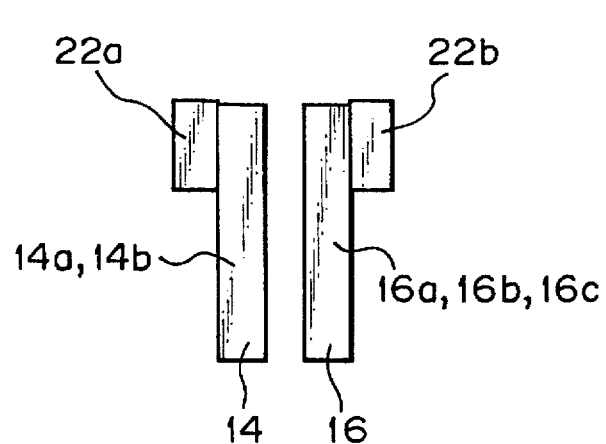
FIG. 3 is a view showing the arrangement of cores and magnetic bars included in the conventional head.
Figure 4:
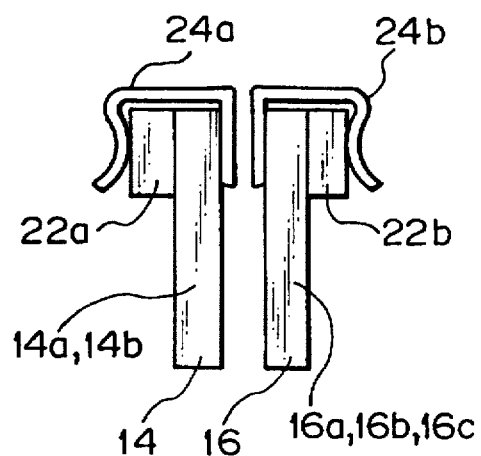
FIG. 4 shows springs which are added to the arrangement shown in FIG. 3.

The slider 12 has two parts 12a and 12b facing each other with the intermediary of a recess 12c. The higher core 14 and lower core 16 are arranged on one part 12a of the slider 12 in parallel with each other. As shown in FIG. 2, the higher core 14 and the lower core 16 respectively have legs 14a and 14b and legs 16a, 16band 16c. A coil 18 is wound round the leg while coils 20a and 20b are wound around the legs 16a and 16c, respectively. Magnetic bars 22a and 22b are respectively held in contact with the legs 14a and 14b and the legs 16a, 16b and 16c for forming a closed magnetic path. FIG. 3 shows the legs 14a, 4b, 16a, 16b and 16c and the magnetic bars 22a and 22b associated therewith. As shown in FIG. 4, springs 24a and 24b each having a U-shaped section may respectively sandwich the legs 14a and 14b and the legs 16a, 16b and 16c, as also proposed in the past.

However, the conventional magnetic head having the above structure has the previously discussed problems (1)–(3).

Figure 5:
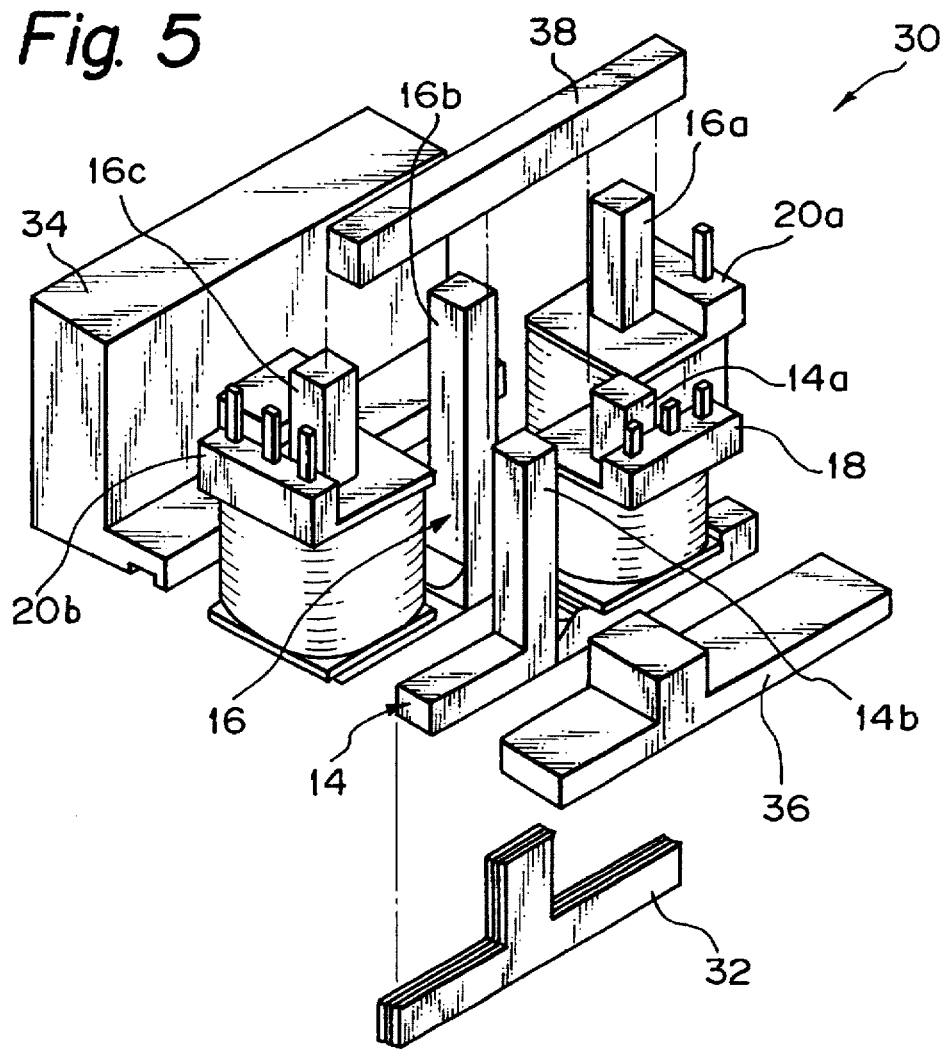
FIG. 5 is a perspective view showing a preferred embodiment of the component magnetic had in accordance with the present invention.

Referring to FIG. 5, a composite magnetic head embodying the present invention is shown. In FIG. 5, the same or similar constituents to those of the conventional head 10 shown in FIGS. 1–4 are designated by the same reference numerals, and redundant description will be avoided for simplicity. As shown, the magnetic head, generally 30, has a higher core 14 and a lower core 16, a shield plate 32 for preventing the cores 14 and 16 from interfering with each other, and sliders 34 and 36. The higher and lower cores 14 and 16 are pressed against each other from opposite sides by the sliders 34 and 36 with the intermediary of the shield plate 32. The higher core 14 and the lower core 16 have legs 14a and 14b and legs 16a, 16b and 16c, respectively. Coils 18, 20a and 20b are wound round the legs 14a, 16a and 16c, respectively. As best shown in FIG. 6, a single magnetic bar or backbar 38 is interposed between and held in close contact with the cores 14 and 15 in order to form a closed magnetic path. To closely contact the cores 14 and 16, the back bar 33 has a slightly greater thickness than the shield plate 32 and is fixed in place by adhesive.

As shown in FIG. 7, the magnetic head may further include a spring 40 having a generally U-shaped section. The spring 40 sandwiches the cores 14 and 16 with the magnetic bar 38 intervening between the cores 14 and 16. The spring 40 further stabilizes the close contact of the magnetic bar 33 with the cores 14 and 16. This insures stable magnetism by removing irregularities particular to manual settings. The contact of the magnetic bar 38 with the cores 14 and 16 is close enough to make the interference of the cores 14 and 16 negligible. It follows that the magnetic bar 38 and spring 40 can be readily accommodated even in the limited space available in the magnetic head of the type shown in FIG. 1, i.e., the head having two cores 14 and 16 in a single slider 12, thereby stabilizing the characteristic of the head. Furthermore, the spring 40 makes point-to-point contact with the legs 14a and 14b of the core 14 and the legs 16a–16c of the core 16 and does not directly biases the magnetic bar 38. Hence, even when the spring 40 is dislocated, the bar 38 remains in close contact with the legs 14a, 14b and 16a–16c since the former is held between the latter.

In the arrangement shown in FIG. 7, the spring 40 is fitted from above the cores 14 and 16. Alternatively, as shown in FIG. 8, the spring 40 may be passed through the cores 14 and 16, and then the magnetic bar 38 may be placed between the cores 14 and 16.

In summary, it will be seen that the present invention provides a composite magnetic head having a single magnetic bar or backbar between a higher core and a lower core, and a single spring fixing the higher and lower cores and backbar in place from both sides. Such a head is not only easy to assemble but also achieves stable recording and reproducing characteristics.

Various modifications will become possible for those skilled in the art after receiving the teachings of the present disclosure without departing from the scope thereof.

What is claimed is:

1. A composite magnetic head for recording and reproducing data from a magnetic disk, comprising:

a slider made up of two parts;

a higher core provided in one of said two parts of said slider for recording and reproducing data from a magnetic disk having a high track density;

a lower core also provided in the one part of said slider and adjoining said higher core for recording and reproducing data from a magnetic disk having a low track density, said higher core and said lower core adjoining each other said higher core and said lower core each comprising a plurality of legs; and a magnetic bar interposed between said legs of said higher core and said lower core wherein said magnetic bar contacts side surfaces of said legs of said higher core and side surfaces of said legs of said lower core to form a closed magnetic path.

2. A magnetic head as claimed in claim 1 further comprising a spring having a generally U-shaped section and sandwiching said legs of said higher core and said legs of said lower core from both sides.

\* \* \* \* \*